Feb. 3, 1970 J. D. CONRAD, JR., ETAL 3,493,249
ECCENTRIC BUSHINGS FOR HOUSINGS
Filed Jan. 18, 1968

WITNESSES
Robert C. Baird
James F. Young

INVENTORS
Joseph D. Conrad, Jr. &
Ralph C. Young, Jr.
BY
Frank Critiano Jr.

United States Patent Office 3,493,249
Patented Feb. 3, 1970

3,493,249
ECCENTRIC BUSHINGS FOR HOUSINGS
Joseph D. Conrad, Jr., Glen Mills, and Ralph C. Young, Jr., Springfield, Pa., assignors to Westinghouse Electric Corporation, Pittsburgh, Pa., a corporation of Pennsylvania
Filed Jan. 18, 1968, Ser. No. 698,972
Int. Cl. F16l 55/00, 35/00
U.S. Cl. 285—39          5 Claims

ABSTRACT OF THE DISCLOSURE

Adjoining pieces of a multipiece housing are assembled by utilizing two eccentric bushings rotatably mounted in misaligned mating bolt holes in the adjoining pieces. By rotating each bushing, the bolt holes in the bushings are aligned to permit a dowel bolt to be inserted through the holes and nuts applied to secure the housing pieces together.

BACKGROUND OF THE INVENTION

This invention relates to means for assembling multipiece housings, particularly housings for relatively large elastic fluid utilizing machines, such as steam turbines.

The large size of turbine cylinders or housings requires that they be built up from pieces small enough to be shipped by railroad or truck. Proper operation of a turbine requires that the several pieces of its housing be assembled to each other with location tolerances of approximately ±.010 inch and held at these locations during the application of high shear loads.

Prior practice has been to drill undersize assembly holes in the housing pieces while they are disassembled. Adjoining pieces are then properly located and the undersized holes are reamed in line to permit dowel bolts to be inserted in the aligned holes. This method requires an additional assembly of the pieces before shipment and manual reaming of the holes due to their inaccessibility to automatic equipment. Both of these operations add cost and manufacturing time to the product.

An object of this invention is to provide means for assembling a multipiece housing having close location tolerances without requiring that the housing pieces be assembled and the assembly holes reamed after said assembly, but prior to shipment.

Another object of the invention is to provide multipiece housing assembly means which permits the housing pieces to be drilled and reamed separately on automatic equipment and still maintain close location tolerances when the pieces are assembled.

Other objects of the invention will be explained fully hereinafter or will be apparent to those skilled in the art.

SUMMARY OF THE INVENTION

In accordance with one embodiment of the invention, assembly holes are drilled and reamed oversize in the pieces of a multipiece housing. An eccentric bushing having a circular hole therethrough of the correct size for the assembly bolts is rotatably mounted in each hole. During assembly, any misalignment of the holes in adjoining pieces is corrected by rotating one or both of the abutting bushings in each pair of mating holes to align the holes in the bushings. Dowel bolts are then inserted through the aligned holes and nuts applied to secure the housing pieces together.

BRIEF DESCRIPTION OF THE DRAWING

For a better understanding of the nature and objects of the invention, reference may be had to the following detailed description, taken in conjunction with the accompanying drawing in which.

DESCRIPTION OF THE PREFERRED EMBODIMENT

Figure 1:
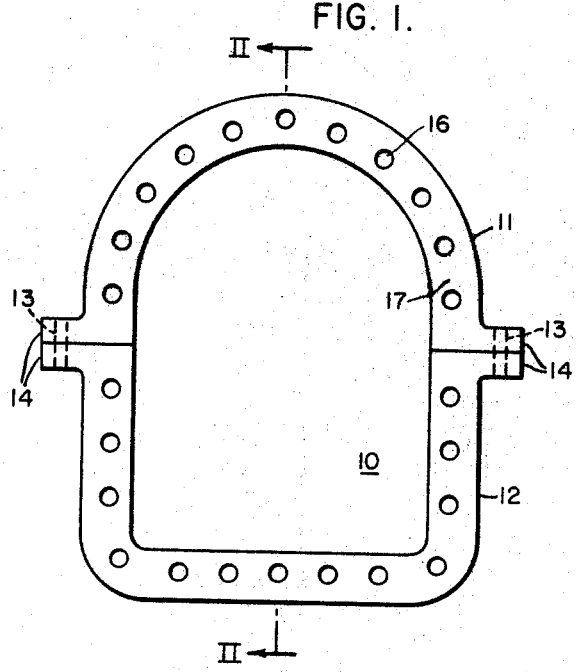
FIGURE 1 is a view, in elevation, of a portion of a turbine housing.

As shown in FIG. 1 of the drawing, a housing 10 for a machine, such as a steam turbine, is divided along a horizontal plane into an upper portion 11 and a lower portion 12. The upper and lower portions may be held together by bolts (not shown) extending through holes 13 in external flanges 14.

Figure 2:
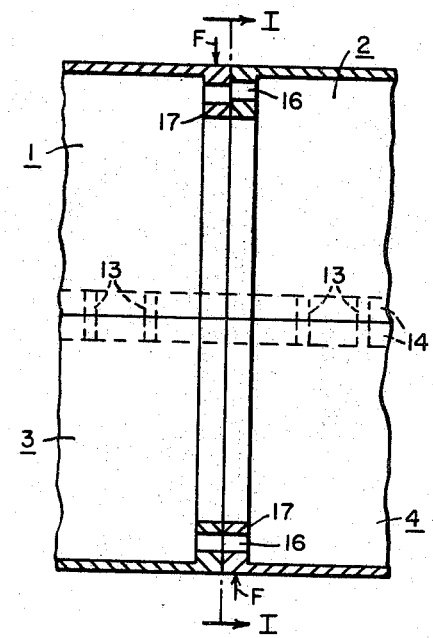
FIG. 2 is a view, in section, taken along the line II—II in FIG. 1.
Figure 3:
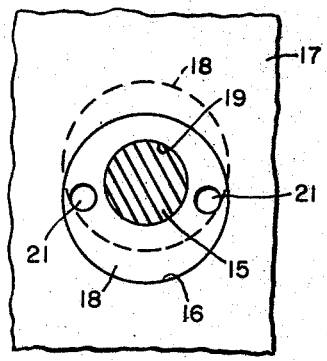
FIG. 3 is an enlarged detail view, taken along line III—III in FIG. 4, of one of the bushing assemblies for the housing.
Figure 4:
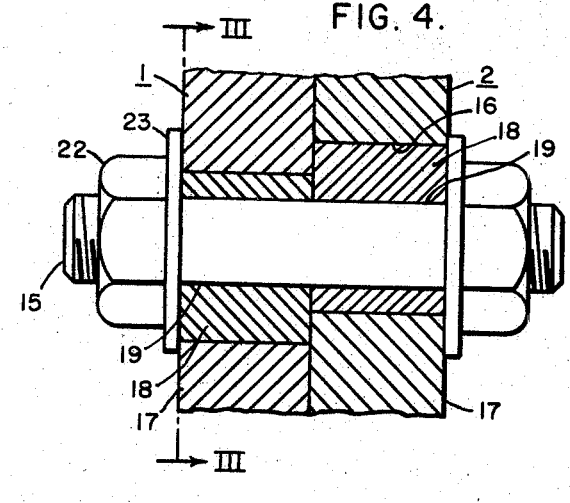
FIG. 4 is an enlarged view, in section, of one of the bushing and dowel bolt assemblies.

In order to facilitate shipment of a large machine, the housing 10 may also be divided along a vertical plane to provide a multipiece housing comprising four pieces 1, 2, 3 and 4 as shown in FIG. 2. In order to maintain the clearances required for proper operation of a machine, such as a turbine, it is essential that the several pieces of the housing 10 be assembled to each other with close location tolerances, for example about ±.010 inch, and held firmly together during the application of high shear loads developed by forces at F as shown in FIG. 2. In the present structure this is accomplished by utilizing dowel bolts 15 extending through mating assembly holes 16 of circular cross-section in internal flanges 17 on the pieces 1, 2, 3 and 4 as shown in FIGS. 2 and 3.

In order to obtain the alignment required for the insertion of the closely fitting dowel bolts 15, the assembly holes 16 may be drilled and reamed oversize to receive cylindrical bushings 18 each of which has a circular hole 19 eccentrically extending therethrough. Each eccentric bushing 18 is preferably of a thickness equal to the thickness of its associated flange, and has two spaced holes or recesses 21 in at least one end thereof to provide for rotation of the bushing in the hole 16 by means of a spanner wrench or other tool. By rotating one or both of the abutting bushings 18 in each pair of mating holes 16 in adjoining pieces of the housing 10 the bolt holes 19 in the abutting bushings are precisely aligned. This permits the closely fitting dowel bolt 15 to be inserted through each pair of bushings 18 and nuts 22 tightened against washers 23 on opposite side of the bolt secure the adjoining pieces of the housing together.

When assembling the housing 10, the pieces 1 and 2 may be assembled together in the manner hereinbefore described. Likewise, the pieces 3 and 4 may be assembled together. Then the assembled pieces 1 and 2, which constitute the upper portion 11 of the housing, may be placed on the assembled pieces 3 and 4, which constitute the lower portion 12 of the housing, and attached by means of the bolts inserted in holes 13. If desired, eccentric bushings 18 may also be provided for the holes 13.

From the foregoing description it is apparent that the invention provides for proper assembly of the several pieces of a multipiece housing having mating assembly holes which may be misaligned. It permits the assembly holes to be drilled and reamed in the separate pieces on automatic equipment during manufacture. Also, the invention makes it unnecessary to assemble the housing pieces prior to installation in service.

Since numerous changes may be made in the above-described construction, and different embodiments of the invention may be made without departing from the spirit and scope thereof, it is intended that all the matter contained in the foregoing description or shown in the accompanying drawing shall be interpreted as illustrative and not in a limiting sense.

We claim as our invention:

1. In a multipiece housing having pairs of mating circular holes in adjoining pieces of the housing, in combination,
   abutting cylindrical bushings of uniform cross-section rotatably mounted in the mating holes,
   each bushing having a circular hole extending eccentrically therethrough,
   means for rotating at least one of each pair of abutting bushings in adjoining pieces of the housing to align the holes in the bushings,
   and holding means of circular cross section extending through the aligned holes with a close fit to secure the housing pieces together.

2. The combination defined in claim 1 wherein the holding means includes threaded means.

3. The combination defined in claim 1 wherein the holding means includes dowel bolts with a nut threaded on each end of the bolt.

4. The combination defined in claim 1 wherein the mating holes are disposed in internal flanges on the housing pieces.

5. The combination defined in claim 1 wherein the rotating means includes recesses in one end of each bushing for rotating both bushings.

References Cited

UNITED STATES PATENTS

| 1,097,185 | 5/1914 | Oehrle. | |
| 1,704,939 | 3/1929 | Grauel | 285—405 |
| 3,006,443 | 10/1961 | Siler. | |

FOREIGN PATENTS 1,281,276  12/1961  France.

DAVID J. WILLIAMOWSKY, Primary Examiner

W. L. SHEDD, Assistant Examiner

U.S. Cl. X.R.

285—178, 405; 287—189.36